UNITED STATES PATENT OFFICE 2,507,313

5,8-BIS(DIETHYLAMINOMETHYL) QUINOLINE

Gustav J. Martin and Roy S. Hanslick, Philadelphia, Pa., assignors to The National Drug Company, Philadelphia, Pa., a corporation of Pennsylvania No Drawing. Application April 30, 1949,
Serial No. 90,782

4 Claims. (Cl. 260—286)

This invention relates to a new compound which is of special therapeutic value as an analgesic agent. More particularly, it relates to 5,8-bis(diethylaminomethyl) quinoline and mineral acid salts thereof and processes for their preparation.

An object of this invention is the preparation of new compounds having superior analgesic properties. A further object is the preparation of 5,8-bis(diethylaminomethyl) quinoline and mineral acid salts thereof. Further objects will appear hereinafter.

It has now been found that 5,8-bis(diethylaminomethyl) quinoline in the form of a mineral acid salt is an effective analgesic agent. 5,8-bis(diethylaminomethyl) quinoline is most advantageously administered therapeutically in the form of its hydrochloride. It can be given orally in doses of 2.5 to 100 mgm., subcutaneously in doses of 2.5 to 100 mgm. and can also be employed topically in the form of an ointment.

The 5,8-bis(diethylaminomethyl) quinoline is advantageously prepared by reacting 5,8-dichloromethylquinoline-hydrochloride with diethylamine in an inert organic solvent. The mineral acid salts, e. g. the hydrochloride, may readily be prepared from the free base by reaction with the acids.

The invention may be more readily understood by consideration of the following illustrative example.

Example

Eight grams of 5,8-dimethyl quinoline are dissolved in dry chloroform containing a small amount of benzoyl peroxide as a catalyst. To this solution are added 50 cc. of sulfuryl chloride, and the solution is refluxed for approximately two hours on the steam bath. The solution is then subjected to vacuum distillation to remove the solvent and excess sulfuryl chloride, until a partially dry solid remains. Dry toluene is then added to this residue and vacuum distilled until a dry solid remains, which is 5,8-dichloromethyl-quinoline-hydrochloride.

To the 5,8-dichloromethylquinoline-hydrochloride are added 150 cc. of dry toluene followed by 20.0 grams of diethylamine. The mixture is stirred until complete solution occurs, during which time the solution becomes green in color and finally a light brown. The solution is allowed to stand for twenty-four hours at room temperature, when it is filtered to remove diethylamine-hydrochloride. The reaction mixture is then vacuum distilled to remove any unreacted diethylamine and toluene leaving 5,8-bis(diethylaminomethyl) quinoline as a water-insoluble, alcohol-soluble oil. The residue is dissolved in absolute ethanol and dry hydrogen chloride is passed into the solution until no further precipitate results. A small volume of dry ether is added to the solution and the precipitate is filtered and air-dried. The solid is washed well with dry chloroform and finally dried, melting at 262° C. The yield is 13.2% of 5,8-bis(diethylaminomethyl) quinoline-hydrochloride.

The 5,8-bis(diethylaminomethyl) quinoline is an oil which is insoluble in water, soluble in alcohol and gives a basic reaction. In addition to the hydrochloride, the 5,8-bis(diethylaminomethyl) quinoline also forms crystalline salts with other mineral acids, e. g. sulfuric and phosphoric acid to yield the sulfate and phosphate, respectively.

As many apparently widely different embodiments of this invention may be made without departing from the spirit and scope hereof, it is to be understood that the invention is not limited to the specific embodiments hereof except as defined in the appended claims.

We claim:
1. 5,8-bis(diethylaminomethyl) quinoline.
2. A mineral acid salt of 5,8-bis(diethylaminomethyl) quinoline.
3. 5,8-bis(diethylaminomethyl) quinoline hydrochloride.
4. A process which comprises reacting 5,8-dichloromethylquinoline-hydrochloride with diethylamine in the presence of an inert organic solvent.

GUSTAV J. MARTIN.
ROY S. HANSLICK.

No references cited.